United States Patent [19]

Lee et al.

[11] Patent Number: 5,153,870
[45] Date of Patent: Oct. 6, 1992

[54] ROTARY HEAD ACTUATOR FOR OPTICAL DISK

[75] Inventors: Neville K. S. Lee, Sherborn; James W. Howard, Natick; Ben Godfrey, Marlboro, all of Mass.

[73] Assignee: Digital Equipment Corporation, Maynard, Mass.

[21] Appl. No.: 374,010

[22] Filed: Jun. 29, 1989

[51] Int. Cl.$^5$ ................................ G11B 7/09
[52] U.S. Cl. ..................... 369/111; 369/44.17; 369/44.19; 369/112
[58] Field of Search .................. 369/34, 35, 100, 101, 369/111, 112, 32, 44.17, 44.19, 44.18, 44.14, 44.15, 44.36, 44.11, 44.21; 360/104, 106

[56] References Cited

U.S. PATENT DOCUMENTS

| | | | |
|---|---|---|---|
| 4,481,510 | 11/1984 | Hareng et al. | 340/784 |
| 4,527,132 | 7/1985 | Huignard | 332/7.51 |
| 4,543,662 | 9/1985 | Huignard et al. | 455/600 |
| 4,581,529 | 4/1986 | Gordon | 250/227 |
| 4,644,516 | 2/1987 | Musha | 369/43 |
| 4,669,073 | 3/1987 | Wakabayashi et al. | 369/111 X |
| 4,688,201 | 8/1987 | Towner et al. | 369/112 X |
| 4,701,021 | 10/1987 | Le Pesant et al. | 350/267 |
| 4,715,024 | 12/1987 | Musha | 369/44 |
| 4,724,495 | 2/1988 | Hedberg et al. | 360/32 X |
| 4,769,800 | 9/1988 | Moser et al. | 369/32 |
| 4,789,228 | 12/1988 | Le Pesant et al. | 350/355 |
| 4,818,052 | 4/1989 | Le Pesant et al. | 350/96.15 |

OTHER PUBLICATIONS

"Optical Switches, two from Thomson-CSF", Photonics Spectra, Apr. 1986.
Keiichi Yoshizumi et al., "Fast Access Actuator for Optical Disk Memory" 1985 Optical Society of Amer.
Schultz & Kry, "Rapid Access Sys. for Optical and Magneto-Optical Disk Storage" IEEE.

Primary Examiner—Robert Weinhardt
Assistant Examiner—Hung Dang
Attorney, Agent, or Firm—Fish & Richardson

[57] ABSTRACT

A rotary actuator for an optical head comprises a pair of reflectors mounted respectively on the end of the arm and on the pivot axis to define an optical path via the arm to an optical disk for an external beam directed along the pivot axis. Special arm geometry reduces variable head skew and consequent image rotation. A multiple platter design features optical switches effectively aligned on the pivot axis.

28 Claims, 4 Drawing Sheets

ROTARY HEAD ACTUATOR FOR OPTICAL DISK

BACKGROUND OF THE INVENTION

The invention relates to rotary actuator systems for optical heads for optical disk drive systems, for example, compact disk read only memories (CD ROMS) and magneto-optical disks.

Emerging optical read and write disk drive technologies promise greatly improved storage densities. However, existing magnetic disk drive technologies have established access speed standards which will be difficult to meet. Existing write once and read only disk drives have seek times much longer than their magnetic counterparts. The higher density of optical disks results primarily in more closely spaced data tracks with tracking tolerances tighter by an order of magnitude. Thus, in order to realize their potential competitive advantage, optical drives must meet already challenging seek time specifications while being even more precise.

An optical disk can have either many tracks in the form of concentric rings or one long spiral track. With concentric tracks, the track pitch is the distance along a radius from one track to the next. For a spiral, the pitch is the radial distance the read head moves when following the spiral for one revolution of the disk. Track pitch for optical drives is about 1 micron, as determined by the diffraction-limited spot size of an 820 nanometer diode laser.

Optical disk drives require a movable optical head positioned by an actuator. The purpose of the head positioning actuator is to seek from one track to another. The total radial excursion of the optical head necessary to cover the data area of the disk is called the stroke.

There are two distinct types of head actuators for optical disk drives: rotary and linear. In a rotary head actuator, the body of the actuator pivots on rotary bearings and the head sweeps out an arcuate path. A linear actuator translates along a single axis radially relative to the disk axis.

SUMMARY OF THE INVENTION

The invention addresses two design goals for rotary actuators for optical heads: reducing moving inertia and reducing image rotation or head skew.

In a first aspect of the invention, a focusing element is mounted on the end of an arm connected to a rotary actuator along with a pair of reflectors mounted respectively on the end of the arm and on the pivot axis of the arm. The focusing element is typically an objective lens defining a focal point on the disk. These optical elements together define an optical path via the arm to the disk for an external beam. In the preferred embodiment, the beam is produced by a stationary source aligned with the pivot axis, and the reflectors are 45° mirrors.

In a multiple disk system, a plurality of actuator arms of the foregoing design are mounted in spaced parallel relationship on a rotary hub. The reflector on the end of at least one arm is paired with a respective optically switchable reflector on the pivot axis of the hub. In one embodiment, the optically switchable reflectors use removable index matching fluid in a beam splitter.

In the second aspect of the invention, the optical head actuator geometry is defined in a particular way. The rotary actuator is positioned such that the pivot axis is located at a distance y. from the disk axis. The focusing element and first reflector are mounted on the ends of the arm at a distance 1 from the pivot axis. The annular data zone of the disk is positioned an average distance $r_2$ from the disk axis. For a particular disk, $y_0$ and 1 are chosen so that $y_0^2$ is approximately equal to the sum of $r_2^2$ and $l^2$ so as to minimize image rotation.

Incorporating a minimum number of optical components in the moving head minimizes the inertia of the actuator thus increasing the mobility of the head and accordingly decreasing the seek time. The reduction in skew angle accomplished by the prescribed geometrical relationship reduces the requirements for electronic compenstion due to head skew in a rotary optical head.

DESCRIPTION OF THE PREFERRED EMBODIMENTS

The drawing is first briefly described as follows.

STRUCTURE

The embodiments of the invention described below are envisioned primarily for use in conjunction with magneto-optical disk technology. However, the rotary head actuator is generally applicable to other optical disk technologies such as write once and read only, including audio CD.

Figure 1:
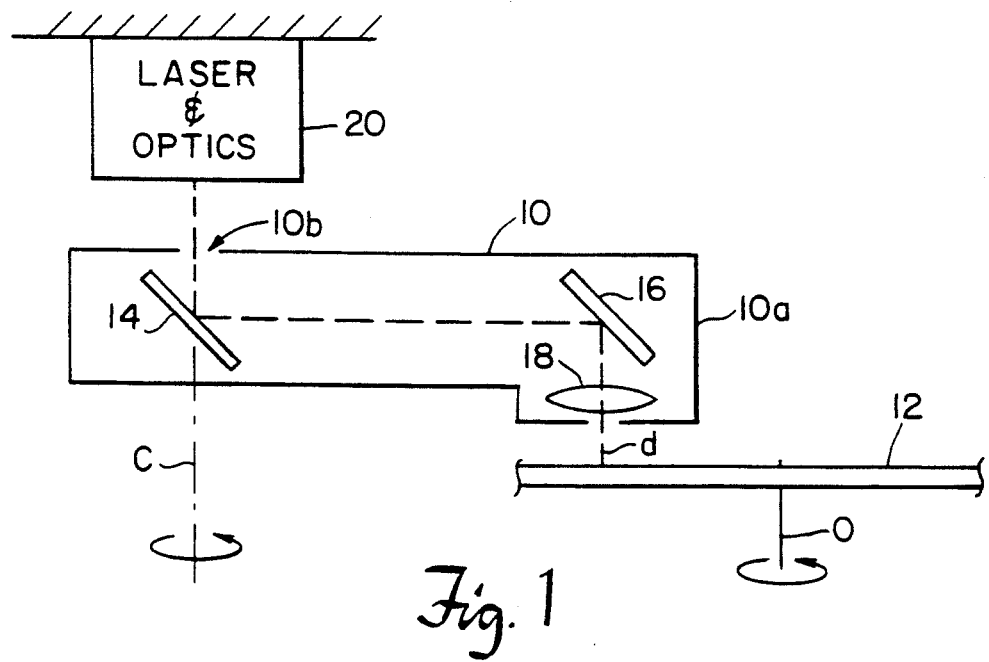
FIG. 1 is a schematic side view of an optical disk drive system with a rotary actuator according to the invention.
Figure 2:
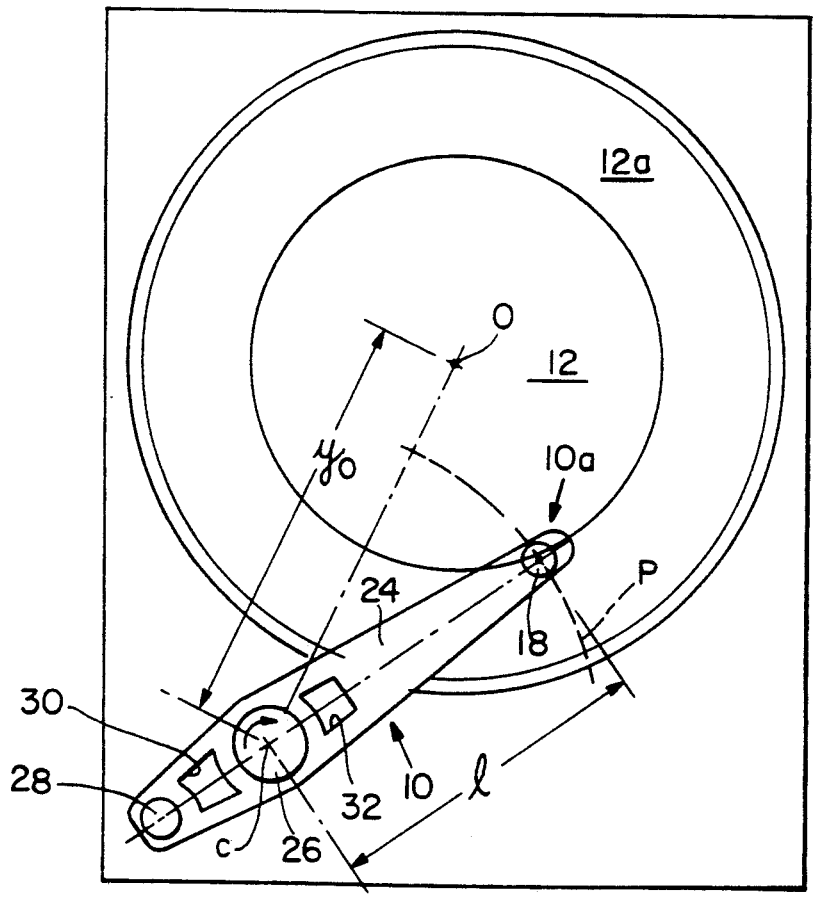
FIG. 2 is a plan schematic view showing a disk drive with a rotary actuator.

As shown in FIGS. 1 and 2, a rotary actuator arm 10 is mounted for rotation on pivot axis c adjacent to a storage disk 12 continuously spinning on a rotary axis O coinciding with the center of the disk. The pivot axis of the arm and disk rotation axis are parallel. The arm 10 terminates in an optical head 10a located generally over the annular data portion 12a of the disk 12.

As shown in FIG. 1, the rotary actuator arm 10 includes a pair of reflectors 14 and 16 which can be either front surface mirrors or prisms, and a miniature objective lens 18 mounted in the optical head 10a. Optical head 10a can include an objective lens on an air bearing slider with an aperture slit as disclosed in U.S. patent application Ser. No. 07/373,991 filed Jun. 29, 1989 by Neville K.S. Lee entitled "Method for Increasing Linear Bit Density in Magneto-Optical Storage Media". The reflectors 14 and 16 are mounted respectively on the pivot axis c and the optical axis d of the lens 18.

Laser and optics module 20 includes a stationary, non-rotating diode laser, collimators, and detection circuitry, including focus and tracking error detectors. The beam from laser and optics module 20 is directed precisely along the pivot axis c through aperture 10b into the arm and is reflected from pivot axis reflector 14 at right angles to the other reflector 16 in the optical head where it is again reflected at right angles through the lens 18 along its optical axis to the focal point of the lens on the disk 12.

As shown in FIG. 2, the other components of the head actuator may follow in general the design of conventional CD players such as the Phillips Model CDB 473 Magnavox Compact Disc Player. In this system, an arm 24 rides on a pair of rotary bearings 26. A half-inch slug of brass or tungsten 28 counterbalances the optical head 10a so that the center of mass of the arm coincides with the pivot axis c. A matched pair of voice coils 30 and 32 are electrically connected in series, one on each side of the pivot to provide balanced torque to avoid side loads on the bearings. The voice coils are made of copper or aluminum. Aluminum is more efficient; however, copper's ease of soldering may reduce manufacturing costs.

Figure 3A:
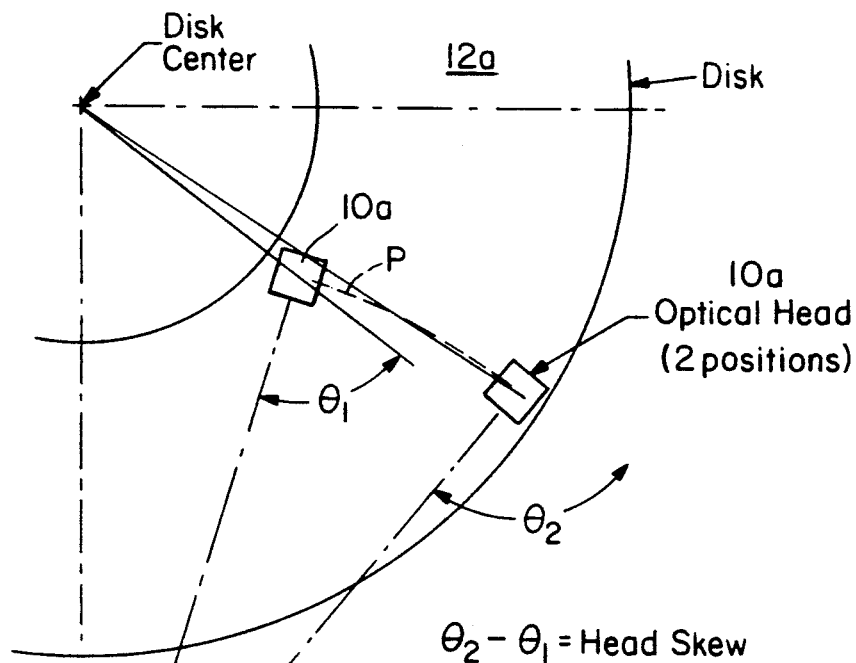
FIG. 3A is a schematic representation of the optical head positions in relation to the disk, illustrating the origin of head skew.
Figure 3C:
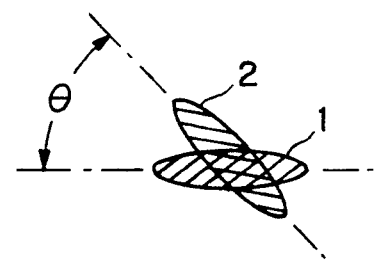
FIG. 3C is a schematic representation of two superimposed pit images corresponding to positions 1 and 2 of FIG. 3B.

The optical head sweeps out an arcuate path p as shown in FIGS. 2 and 3A covering the annular data area 12a. The angle between the actuator and a radius drawn from the center of the disk to the head is defined as head skew. As shown in FIG. 3A, rotary actuators have continuously changing head skew unless the head is counter-rotated as the actuator moves. Changing skew causes rotation of the track image on the optical detector. The optical detector provides three signals: focus error, track error (usually via a so-called quad cell) and a data signal. If the image rotates, the track error signal will change slightly requiring compensation. The effect of variable image skew is not eliminated by removing the optical detector to a stationary platform as shown in FIG. 1. However, the change in skew angle and consequent image rotation can be minimized by choosing the arm length and pivot axis location in a particular way.

Figure 3B:
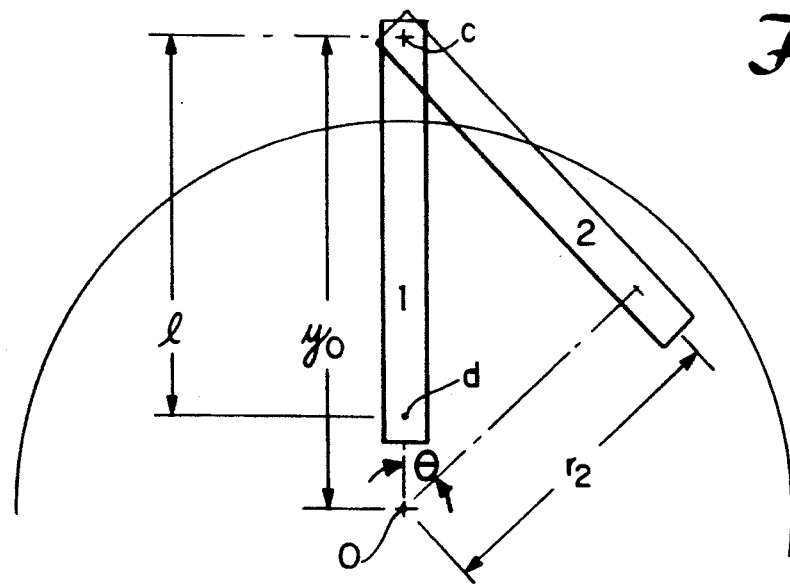
FIG. 3B is a schematic representation of a rotary actuator arm which reduces head skew according to the invention.

As shown in FIG. 3B, the length 1 is the arm length from the pivot axis to the optical axis d of the objective lens 18. The length $y_o$ is the distance between the arm pivot axis c and disk rotational axis O and $r_2$ is the distance from the disk axis to the midpoint in the annular data area of the disk. Thus, the length $r_2$ is the average track radius. The angle $\theta$ represents the skew angle as the angle between the reference radius intersecting the pivot axis and the variable radius intersecting the optical head.

It can be shown that the angle $\theta$ bears the following relationship to the other parameters:

$$\cos^{-1}[(r_2^2 + y_o^2 - 1^2)/2y_o r_2]$$

It can be further shown that the skew angle is minimized when $y_o^2 = r_2^2 + 1^2$.

Examples are given by the following table:

| Model | $y_o$ | $r_2$ | 1 | θ | Δθ |
|---|---|---|---|---|---|
| 1 | 6.4 | 3.375 | 5 | 50.7° | 0.7° |
|   | 6.4 | 4.0 | 5 | 51.4 |  |
|   | 6.4 | 4.5 | 5 | 51.0 |  |
| 2 | 5.7 | 3.375 | 4 | 43.6° | 1.0° |
|   | 5.7 | 4.0 | 4 | 44.6 |  |
|   | 5.7 | 4.5 | 4 | 44.3 |  |

-continued

| Model | $y_o$ | $r_2$ | 1 | θ | Δθ |
|---|---|---|---|---|---|
| 3 | 5.0 | 3.375 | 3 | 35.7° | 1.2° |
|   | 5.0 | 4.0 | 3 | 36.9 |  |
|   | 5.0 | 4.5 | 3 | 36.3 |  |
| 4 | 3.79 | 2.0 | 3 | 51.9° | 0.4° |
|   | 3.79 | 2.313 | 3 | 52.3 |  |
|   | 3.79 | 2.625 | 3 | 52.0 |  |

The foregoing table represents four different models, each one provided with three rows of data. In each group, the second row corresponds to the geometric mean radius of the data area. Thus, the first three groups all have the same size disks with a geometric mean track radius of 4.0 units, e.g., inches. The first and third rows of each group represent other angular positions of the optical head in the data area nearer or farther from the disk axis. The third group represents the familiar 3-4-5 right triangle, in which the effective pivoted arm length is three units and the pivot axis distance from the disk axis is five units. In groups 1 and 2, the arm length 1 is chosen as 5 and 4, respectively, with corresponding alterations in the radial distance of the pivot axis.

The fourth model is based on a smaller disk with a geometric mean track radius of 2.313.

The difference in the head skew angle given by the values of $\theta$ is seen to vary only slightly for any of the four models. As expected, Δθ, namely, the change in skew angle which is desirably minimized, is lowest for the longest arm in model 1. However, for the smaller disk in model 4, Δθ is even smaller, less than a half a degree.

The optimal pivot axis location for the split head design with stationary optics 20 is different than for an integrated head with laser, optics and detectors all on the end of the arm. For both split and integrated heads, it turns out that minimum image rotation occurs when the actuator pivot point, the center of the disk and the point where the head is over the geometric mean track form a right triangle. However, for the split head, the track radius is the hypotenuse of the triangle, whereas for the integrated head the actuator arm should be the hypotenuse. Thus, the arm can generally be made shorter for the split head design, which makes it stiffer.

Figure 4:
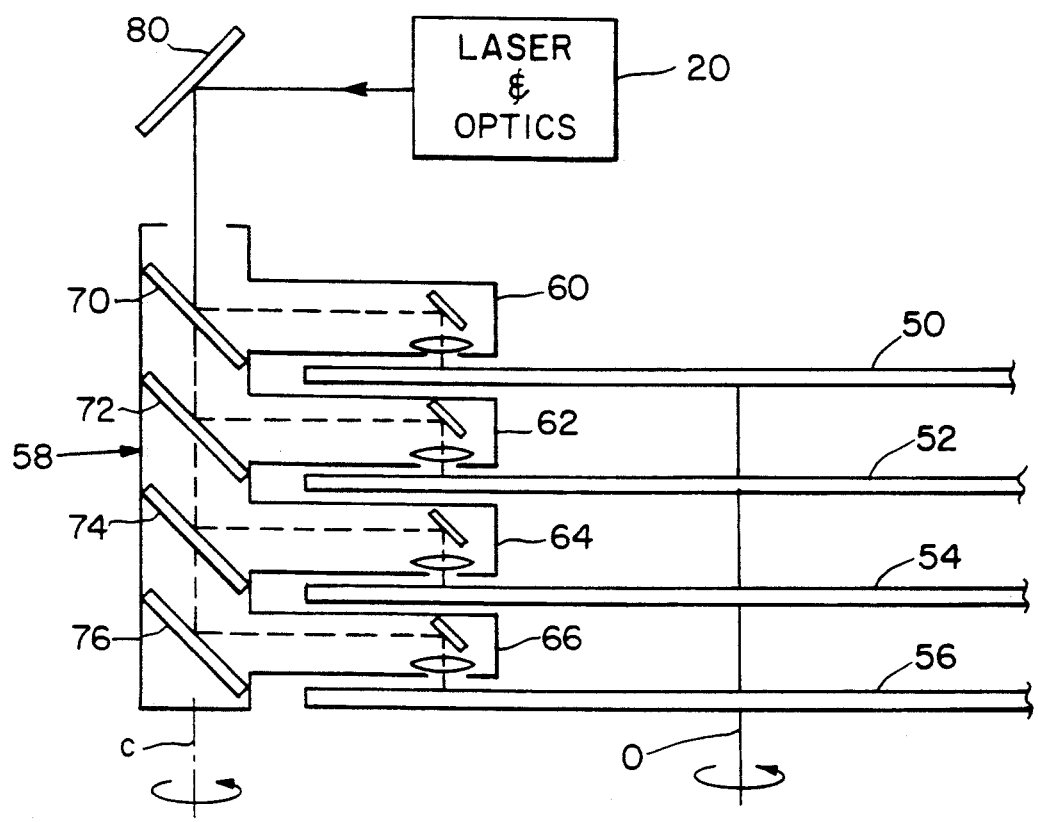
FIG. 4 is a schematic side view of a multiple disk embodiment of the rotary actuator system according to the invention.

As shown in FIG. 4, a multiple disk arrangement taking advantage of the rotary split head design of FIG. 1 includes a plurality of spaced coaxially arranged spinning disks 50, 52, 54 and 56. The disks can be either single.or double-sided in this embodiment, as well as in the single disk embodiment of FIG. 1. The head actuator employs a central elongated hub 58 mounted on the pivot axis c and supporting a plurality of spaced actuator arms 60, 62, 64 and 66 sized to fit between the disks as shown in FIG. 4. Optically switchable pivot axis reflectors 70, 72, 74 and 76 are paired with the optical heads on the arms 60, 62, 64 and 66. The reflectors 70, 72 and 74 either reflect or transmit light depending on their state.

Figure 5:
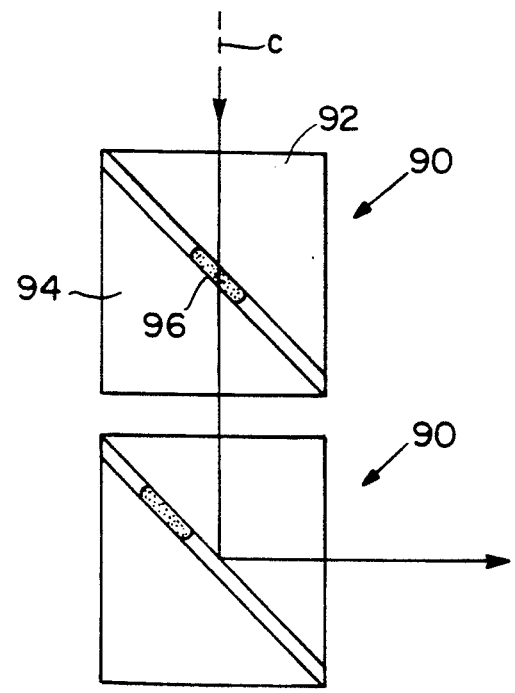
FIG. 5 is a schematic side view of a cube beam splitter arrangement with index matching fluid to implement the optical switches of FIG. 4.
Figure 6:
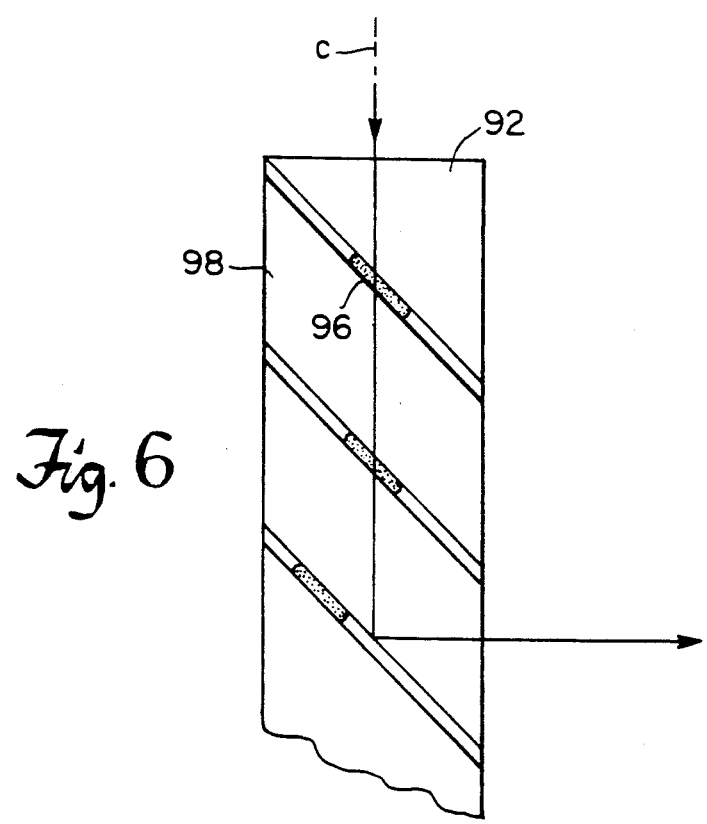
FIG. 6 is a schematic side view of a preferred embodiment of the optical switch system of FIG. 5 in which the spaced beam splitters are united.

Preferably, cube beam splitters 90 made of spaced prisms 92 and 94 with displaceable refractive index matching liquid 96 at the interface are used as the switching medium for reflectors 70–74, as shown in FIG. 4. FIG. 6 shows a preferred embodiment in which adjacent cube beam splitters as in FIG. 5 are joined at 98, for example, eliminating extra air/glass interfaces and facilitating optical alignment.

Figure 7:
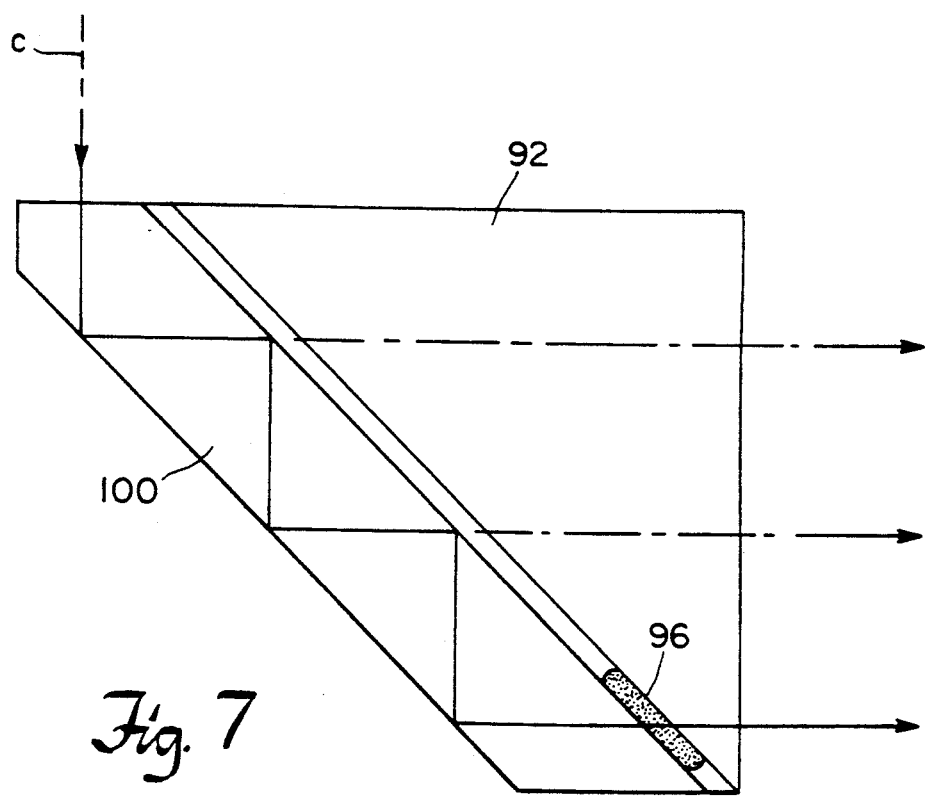
FIG. 7 is a schematic side view of an alternate embodiment of the optical switch system of FIG. 5.

FIG. 7 is an alternate configuration which accomplishes switching with one or more globules of index matching fluid The optical switch arrangement of FIG. 7, although diagonally disposed, is thus effectively aligned on the pivot axis c.

Details of an electrically displaceable index matching liquid system are disclosed in U.S. Pat. Nos. 4,789,228 and 4,818,052, issued Dec. 6, 1988 and Apr. 4, 1989, both to LePesant et al., entitled "Electrically Controlled Optical Switching Device" and "Device for Optical Switching by Fluid Displacement . . . ", respectively, incorporated herein in their entirety.

For example, to activate head 64 (FIG. 4), the index matching fluid is removed from the prisms interface of reflector 74, while the index matching fluid remains present at the interfaces of the reflectors 70 and 72. Thus, the light beam from optics module 20 reflected via mirror or prism 80 passes through reflectors 70 and 72 which have been rendered transmissive by the presence of the index matching fluid, but is fully reflected by the reflector 74 to the optical head on arm 64 which directs it to disk 54. To switch to a different arm, the index matching fluid from another one of the reflectors is removed and restored to the interface with reflector 74. Of course, reflector 76, being the last in line, does not have to be optically switchable but can remain fully reflective at all times.

The index matching fluid system can be extended to any number of interfaces. For example, to activate device number n, the index matching fluid is removed from the number n interface while leaving the rest of the interfaces filled. To switch to interface m, the n interface is filled and the fluid is removed from interface m.

The geometry discussed in connection with FIG. 3B for the split head design would be equally applicable to the multiple disk embodiment of FIG. 4, i.e., with each arm bearing the same geometrical relationship.

The foregoing description of specific embodiments is offered as an illustration rather than a limitation on the scope of the invention. Various modifications, refinements, additions or subtractions can be made to the disclosed embodiments without departing from the principle and spirit of the invention. For example, other means of optical switching can be used to implement a multiple disk design. In any event, the intended scope of the invention is indicated by the appended claims and their respective equivalents.

What is claimed is:

1. An optical head actuator for an optical disk drive, comprisnig
   a rotary actuator having a pivot axis, and
   a plurality of arms connected to said actuator extending away from said pivot axis,
   each respective arm comprising
     a focusing element mounted on the end of said respective arm defining a focal point adjacent said arm,
     a first reflector mounted on the end of said respective arm in optical alignment with said focusing element, and
     a second reflector mounted on said actuator in optical alignment with said pivot axis for reflecting an external beam originating outside said actuator and said respective arm toward said first reflector,
   said first and second reflectors and said focusing element of each respective arm together defining an optical path to the disk via said actuator and said respective arm,
   said second reflector associated with at least one of said arms comprising an optical switch responsive to activation/deactivation signals, said optical switch being constructed to cause said second reflector to enter a reflective state so as to reflect said external beam to or from the end of said at least one arm when said optical switch is activated and to cause said second reflector enter to a transmissive state so as to transmit said external beam along said pivot axis to a second reflector associated with another of said arms when said optical switch is deactivated.

2. The actuator of claim 1, wherein said external beam is directed along said pivot axis.

3. The actuator of claim 1, wherein said reflectors and focusing element of each respective arm are interconnected to define a fixed length optical path.

4. The actuator of claim 1, wherein said first and second reflectors of each respective arm both have an effective orientation of about 45° with respect to the pivot axis.

5. The actuator of claim 1, further comprising means on said actuator defining an aperture lying on the pivot axis for admitting an external beam along the pivot axis incident on said second reflector of each respective arm.

6. An optical head actuator for a multiple optical disk drive, comprising
   a rotary actuator hub,
   a plurality of actuator arms mounted in axially spaced parallel relationship on said hub for rotation therewith,
   means defining a collective unitary pivot axis for said arms on said hub,
   each arm having a focusing element mounted on the end of the arm and a first reflector mounted on the end of the arm in optical alignment with the respective focusing element,
   a plurality of second reflectors mounted in the hub in optical alignment with said pivot axis corresponding to said first reflectors, each set of first and second and the respective focusing element defining an optical path through the respective arm, and
   means for defining an optical path through the hub along the pivot axis to a selected one of said second reflectors
   at least one of said second reflectors comprising an optical switch responsive to activation/deactivation signals, said optical switch being constructed to cause said second reflector to enter a reflective state so as to reflect light to or from the end of the respective arm when said optical switch is activated and to cause said second reflector to enter a transmissive state so as to transmit light along the pivot axis to the next second reflector when said optical switch is deactivated.

7. The actuator of claim 6, wherein said optical switch includes a displaceable index matching fluid.

8. The actuator of claim 6, wherein at least all but the last second reflector comprise an optical switch responsive to activation/deactivation signals, each said optical switch being constructed to cause a respective second reflector to enter a reflective state so as to reflect light to or from the end of the respective arm when said optical switch is activated and to cause said second reflector to enter a transmissive state so as to transmit light along the pivot axis to the next second reflector when said optical switch is deactivated.

9. An optical drive system, comprising
an optical disk mounted for continuous rotation on a disk axis and having an annular data zone positioned an average distance $r_2$ from the disk axis,
a rotatable head actuator arm,
means defining a pivot axis for said arm at a distance $y_o$ from the disk axis,
a focusing element mounted on the end of said arm at a distance 1 from the pivot axis,
a first reflector mounted on the end of said arm in optical alignment with said focusing element,
a second reflector mounted on the pivot axis of said arm,
said first and second reflectors and focusing element defining an optical path via the arm to the disk,
$y_o^2$ being approximately equal to the sum of $r_2^2$ and $1_2$, so as to minimize image rotation.

10. The system of claim 9, further comprising means defining an aperture on the arm lying on the pivot axis for admitting an external beam along the pivot axis incident on said second reflector.

11. The system of claim 9, wherein said first and second reflectors and focusing element are the only optical elements on said arm.

12. The system of claim 9, wherein said first and second reflectors and focusing element are interconnected to define a fixed length optical path through the arm.

13. The system of claim 9, wherein said first and second reflectors are both arranged at about 45° to the pivot axis and the optical axis of the focusing element is parallel to the pivot axis.

14. An optical drive system, comprising
a stationary laser optics module,
at least one optical disk mounted for continuous rotation on a disk axis,
a plurality of rotatable arms,
means defining a pivot axis for each said arm adjacent to said disk approximately parallel to said disk axis,
a focusing element mounted on the end of each arm,
a first reflector mounted on the end of each arm in optical alignment with the focusing element,
a second reflector mounted on the pivot axis on each arm,
said first and second reflectors and focusing element defining an optical path through each arm, and
means one ach arm defining an aperture lying on said pivot axis for admitting a beam along said pivot axis to or from said laser optics module incident on said second reflector of each arm, wherein
said second reflector of at least one of said arms comprisign an optical switch responsive to activation/-deactivation signals, said optical switch being constructed to cause said second reflector to enter a reflective state so as to reflect light to or from the end of said at least one arm when said optical switch is activated and to cause said second reflector to enter a transmissive state so as to transmit light along said pivot axis to the next second reflector when said optical switch is deactivated.

15. The system of claim 14, wherein said first and second reflectors and focusing element are the only optical components on each arm.

16. The system of claim 14, wherein said first and second reflectors and focusing element are interconnected to define a fixed length optical path througheach arm.

17. The system of claim 14, whereins aid first and second reflectors of each arm are both arranged at about 45° with respect to the pivot axis and the optical axis of said focusing element of each arm is parallel to said pivot axis.

18. An optical drive system, comprising
a stationary laser optics module,
an optical disk mounted for continuous rotation on a disk axis,
a plurality of rotatable arms,
means defining a pivot axis for each said arm adjacent to said disk approximately parallel to said disk axis,
a focusing element mounted on the end of each arm,
a first reflector mounted on the end of each arm in optical alignment with the focusing element,
a second reflector mounted on the pivot axis on each arm,
said first and second reflectors and focusing element defining an optical path through each arm, and
means one ach arm defining an aperture lying on said pivot axis for admitting a beam along said pivot axis to or from said laser optics module incident on said second reflector,
said disk having an annular data zone at an average radius $r_2$ from said disk axis, said arm having a length 1 from the pivot axis to the focusing element and the distance between the pivot axis and the disk axis $y_o$ being related to lengths 1 and $r_2$ as follows:

$$y_o^2 = r_2^2 + l^2,$$

whereby image rotation is reduced.

19. The system of claim 18, wherein said stationary laser optics module includes a track error detector.

20. A method of reading/writing to an optical disk having an annular data area, comprising
supporting an optical head at a fixed radius from a pivot axis adjacent the disk and parallel to the disk axis for rotation about said pivot axis over an arc covering said data area,
directing a beam from a stationary source along said pivot axis,
deflecting said beam from said pivot axis to said optical head at any angular position within said arc, and
redirecting said beam from said optical head to the disk,
the distance between said pivot axis and the disk axis being the hypotenuse of a right triangle formed with said optical head as the other vertex when said head is over the middle of said data area.

21. The method of claim 20, further comprising focusing the beam on the disk.

22. A method of reading/wright to a set of multiple optical disks having a common disk axis, each disk having an annular data area, comprising
supporting a plurality of axially spaced optical heads at a fixed radius from a pivot axis adjacent the disk and parallel to the disk axis for rotation about said pivot axis over an arc covering the data areas of said disks,
directing a beam from a stationary source along said pivot axis,
deflecting said beam from said pivot axis to a selected one of said optical heads at any angular position within said arc, by optically switching from a reflective to a transmissive state so as to reflect said beam to or form said at least one optical head when in the reflective state and to transmit said beam along said pivot axis to the next optical head in the transmissive state, and redirecting said beam from said selected optical head to the disk.

23. The method of claim 22, wherein said step of deflecting said beam to a selected head includes removing a refractive index matching fluid from a corresponding optical interface on said pivot axis.

24. An optical drive system, comprising at least one optical disk mounted for continuous rotation on a disk axis and having an annular data zone positioned an average distance $r_2$ from the disk axis, a plurality of rotatable head actuator arms at a distance $y_o$ from the disk axis, a focusing element mounted on the end of each said arm at a distance $l$ from the pivot axis, a first reflector mounted on the end of each said arm in optical alignment with said focusing element, and a second reflector mounted on the pivot axis of each said arm, said first and second reflectors and focusing element of each arm defining an optical path via the arm to the disk, $y_o^2$ being approximately equal to the sum of $r_2^2$ and $l^2$, so as to minimize image rotation, said second reflector of at least one of said arms comprising an optical switch responsive to activation/deactivation signals, said optical switch being constructed to cause said second reflector to enter a reflective state so as to reflect light to or from the end of said at least one arm when said optical switch is activated and to cause said second reflector to enter a transmissive state so as to transmit light along said pivot axis to the next second reflector when said optical switch is deactivated.

25. The system of claim 24, further comprising means defining an apertuer on each arm lying on the pivot axis for admitting an external beam along the pivot axis incident on said second reflector of each arm.

26. The system of claim 24, wherein said first and second reflectors and focusing element are the only optical elements on each said arm.

27. The system of claim 24, wherein said first and second reflectors and focusing element are interconnected to define a fixed length optical path through each arm.

28. The system of clami 24, wherein said first and second reflectors of each arm are both arranged at about 45° to the pivot axis and the optical axis of the focusing element of each arm is parallel to the pivot axis.

* * * * *

UNITED STATES PATENT AND TRADEMARK OFFICE
CERTIFICATE OF CORRECTION

PATENT NO.  : 5,153,870

DATED       : October 6, 1992

INVENTOR(S) : Neville K.S. Lee; James W. Howard; Ben Godfrey

It is certified that error appears in the above-identified patent and that said Letters Patent is hereby corrected as shown below:

Title page, item [56], col. 2, line 4,
In the "References Cited" under "Other Publications":

In the Reference "Optical Switches..." after "1986." insert --, pages 46 and 47.--;

In the Reference "Fast Access..." replace "Amer." with --America, Washington, DC, pp. ThAA5-1-4.--;

In the Reference "Rapid Access..." replace "IEEE." with --IEEE Transactions on Magnetics, Vol. Mag-22, No. 5, September 1986, pp. 925-927.--;

Col. 1, line 67, replace "y." with --$y_0$--;

Col. 4, line 51, delete "." after "single";

Col. 5, line 3, after "fluid" insert --moving over a single interface between two prisms 92 and 100.--;

Col. 5, line 25, replace "0f" with --Of--;

Col. 8, line 1, replace "throughe" with --through--;

Col. 8, line 2, replace "ach" with --each--;

Col. 8, line 3, replace "whereins aid" with --wherein said--;

Col. 8, line 12, delete "plurality of";

Col. 8, line 12, replace "arms," with --arm,--;

UNITED STATES PATENT AND TRADEMARK OFFICE
CERTIFICATE OF CORRECTION

PATENT NO. : 5,153,870
DATED : October 6, 1992
INVENTOR(S) : Nevelle K. S. Lee, et. al.

It is certified that error appears in the above-indentified patent and that said Letters Patent is hereby corrected as shown below:

Col. 8, line 22, replace "one ach" with --on said--;

Signed and Sealed this

Fourteenth Day of February, 1995

Attest:

BRUCE LEHMAN

*Attesting Officer*  *Commissioner of Patents and Trademarks*